| United States Patent [19] | [11] Patent Number: 4,937,293 |
| Blum et al. | [45] Date of Patent: Jun. 26, 1990 |

[54] MOISTURE-HARDENING BINDER COMPOSITIONS, A PROCESS FOR THEIR PRODUCTION AND THEIR USE

[75] Inventors: Harald Blum, Wachtendonk; Josef Pedain, Cologne; Christian Wamprecht, Krefeld, all of Fed. Rep. of Germany

[73] Assignee: Bayer Aktiengesellschaft, Leverkusen, Fed. Rep. of Germany

[21] Appl. No.: 170,941

[22] Filed: Mar. 21, 1988

[30] Foreign Application Priority Data

Apr. 1, 1987 [DE] Fed. Rep. of Germany ....... 3710963

[51] Int. Cl.$^5$ .................. C08F 8/32; C08F 220/08; C08F 222/06
[52] U.S. Cl. .................. 525/327.6; 525/207
[58] Field of Search ............ 525/285, 327.6, 207

[56] References Cited

U.S. PATENT DOCUMENTS 4,279,793  7/1981  Wellner et al. ............... 260/18 R
4,758,632  7/1988  Parekh et al. ................. 525/383

FOREIGN PATENT DOCUMENTS 012269  6/1980  European Pat. Off. .

Primary Examiner—John C. Bleutge
Assistant Examiner—Susan Berman
Attorney, Agent, or Firm—Connolly and Hutz

[57] ABSTRACT

Binder compositions comprising
(A) copolymers having a molecular weight of from 1500 to 75000 of maleic acid anhydride with other selected olefinically unsaturated monomers,
(B) organic polyamines with aldimine- and/or ketimine-blocked amino groups and, optionally, reaction products containing amide groups of (i) copolymers (A) with (ii) polyamines having free and blocked amino groups, a process for the production of these compositions by mixing components (A) and (B) and optionally partially blocked polyamines which react with a part of component (A) under formation of component (C) as well as the use of these binder compositions as binder in lacquers, coating compositions or sealing compounds.

7 Claims, No Drawings

MOISTURE-HARDENING BINDER COMPOSITIONS, A PROCESS FOR THEIR PRODUCTION AND THEIR USE

BACKGROUND OF THE INVENTION

This invention relates to moisture-hardening binder compositions consisting essentially of special maleic anhydride copolymers and at least difunctional organic polyamines in aldimine- and/or ketimine-blocked form, to a process for the production of these binder compositions and to their use as binders in lacquers, coating compositions and sealing compounds.

The reaction of amines with anhydrides is one which takes place very quickly, even at room temperature, leading to carboxylic acid semiamides with cleavage of the anhydride ring. The resulting, extremely short standing times have hitherto prevented polyanhydrides and polyamines from being used together in coating systems. Even 2-component binders cannot be used safely in terms of application.

A possible solution is described in DE-OS No. 2 853 477 which describes mixtures of blocked polyamines and polyanhydrides which have good standing times, but harden into crosslinked products on addition of water. Ketimines or aldimines obtained by reaction of polyamines with ketones or aldehydes are described as suitable blocked polyamines.

The polyanhydrides mentioned are compounds containing at least two cyclic carboxylic acid anhydride groups in the molecule, more especially reaction products of polyols with cyclic dianhydrides, in which the ratio of hydroxyl to anhydride groups is 1:2, or copolymers of an unsaturated cyclic anhydride with polyunsaturated compounds or α-olefins.

The olefinically unsaturated compounds used in the preparation of the copolymers are only described in very broad terms in the general description of DE-OS No. 2 853 477 without any reference to the quantitative ratios between the individual monomers which are to be used in the preparation of the copolymers. The specific disclosure of the Examples is confined to copolymers of butadiene oil and maleic anhydride in a ratio of 1:1 and to copolymers of wood oil with maleic anhydride. However, these copolymers are attended by disadvantages because combinations thereof with bisketimines or bisaldimines ultimately lead to heavily discolored products. For the rest, coating compositions containing unsaturated oil, such as butadiene oil or wood oil, as binder component lead to coatings which have a marked tendency to turn brittle and are not weather resistant.

In addition, as can be seen from the Examples of DE-OS No. 2 853 477, dimethylformamide has to be used as solvent in the processing of the binders specifically described therein, besides which unacceptable solids contents of only around 20% are used.

The object of the present invention is to provide new binder compositions based on copolymers containing anhydride groups and aldimine- and/or ketimine-blocked polyamines which are not attended by the above-mentioned disadvantages and which are suitable for the production of high-quality, moisture-hardening systems which may be hardened in reasonable times to form clear, non-yellowing, solvent-resistant films.

According to the invention, this object is achieved by the provision of the binder compositions described in detail hereinafter. In addition to organic polyamines in aldimine- and/or ketimine-blocked form, selected maleic anhydride copolymers are present in the binder compositions according to the invention.

SUMMARY OF THE INVENTION

The present invention relates to moisture-hardening binder compositions comprising
 (A) copolymers of maleic anhydride with other olefinically unsaturated monomers having a molecular weight Mw in the range from 1500 to 75 000 and
 (B) organic polyamines containing amino groups exclusively present in aldimine- and/or ketimine-blocked form,
characterized in that component (A) consists of copolymers prepared in known manner of
 (a) 3 to 45% by weight maleic anhydride,
 (b) 5 to 80% by weight monomers corresponding to the following formula

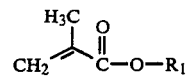

and/or to the following formula

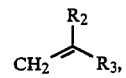

(c) 15 to 92% by weight monomers corresponding to the following formula

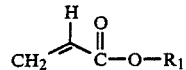

and
 (d) 0 to 20 % by weight liquid butadiene (co)polymers having a number-average average molecular weight of 500 to 3500, a viscosity at 20° C. of 200 to 50 000 mPa.s and an iodine value according to Wijs of 380 to 470 g iodine/100 g substance,
the percentages shown adding up to 100; in the above formulae,
$R_1$ is an aliphatic or cycloalipatic $C_1$–$C_{12}$ hydrocarbon radical optionally containing oxygen, sulfur or nitrogen as hetero atoms,
$R_2$ is hydrogen, a methyl or ethyl group or chloride or fluorine,
$R_3$ is an aliphatic $C_2$–$C_{15}$ hydrocarbon radical, a cycloaliphatic $C_5$–$C_{10}$ hydrocarbon radical, an araliphatic $C_7$–$C_{18}$ hydrocarbon radical, an aromatic $C_6$–$C_{12}$ hydrocarbon radical, chlorine, fluorine, a nitrile group or a $C_2$–$C_{18}$ hydrocarbon radical containing one or more hetero atoms from the group comprising oxygen, sulfur and nitrogen in the form of ether, ester, amide, urethane, urea thioester, thioether, oxirane, ketone, lactam or lactone groups.

The present invention also relates to special binder compositions of the type in question which are characterized in that they contain as a further component
 (C) reaction products containing amide groups of
  (i) copolymers (A) with
  (ii) both free and blocked organic polyamines containing in all at least two primary and, optionally secondary amino groups which (on a statistically average) contain at most one free primary amino group or secondary amino group and at least one primary amino group present in aldimine- and- /or ketimine-blocked form.

The present invention also relates to a process for the production of these binder compositions which is characterized in that the maleic anhydride copolymers (A) are mixed with (B) organic polyamines containing primary amino groups exclusively present in aldimine- and/or ketimine-blocked form and, optionally, (C) organic polyamines containing free amino groups and amino groups present in aldimine- and/or ketimine-blocked form, these organic polyamines containing at most one free amino group and at least one blocked amino group, optionally in the presence of solvents and/or other auxiliaries and additives known from lacquer technology, the quantitative ratios between the individual components, including the spontaneous condensation reaction taking place between free amino groups and anhydride groups, being selected so that the resulting mixture contains 0.25 to 5 anhydride groups for every blocked amino group.

The present invention also relates to the use of these binder compositions as binders in moisture-hardening lacquers, coating compositions or sealing compounds.

DETAILED DESCRIPTION OF THE INVENTION

Component (A) of the binder composition according to the invention consists of copolymers of maleic anhydride with monomers of the type mentioned above under (b) and (c); butadiene (co)polymers of the type mentioned above under (d) may also be used, although this is less preferred for the reasons explained above.

Preferred monomers (b) and (c) are those corresponding to the above general formulae in which $R_1$ is a linear or branched, aliphatic $C_1$–$C_8$ hydrocarbon radical, $R_2$ is hydrogen or a methyl group and $R_3$ is an aromatic $C_6$–$C_{12}$ hydrocarbon radical (including aromatic radicals containing aliphatic substituents), a nitrile group, a $C_2$–$C_9$ carboxylate group, a $C_2$–$C_7$ alkoxy group or an aminocarbonyl group optionally containing at the nitrogen atom a $C_1$–$C_6$ alkyl substitutent optionally containing ether bridges.

Typical examples of suitable or preferred radicals $R_1$ are methyl, ethyl, n-propyl, isopropyl, n-butyl, isobutyl, n-pentyl, n-hexyl, 2-ethylhexyl, n-octyl, n-decyl or n-dodecyl radicals.

Typical examples of suitable or preferred substituents $R_2$ are hydrogen, methyl, ethyl, chlorine or fluorine.

Typical examples of suitable or preferred substituents $R_3$ are aliphatic radicals of the type just mentioned by way of example for $R_1$ and, in addition, phenyl, cyclohexyl, 2-, 3- and 4-methylphenyl, propoxy, n-butoxy, acetyl, propionyl, n-butyryl or N-methoxymethylaminocartonyl radicals.

The optional component (d) is a low molecular weight, liquid butadiene polymer having a number-average molecular weight $M_n$ of 500 to 3500, a viscosity of 200 to 50 000 mPa.s (at 20° C.) and an iodine value according to Wijs of 320 to 470 g iodine/100 g substance, such as for example Polyöl 110 or Polyöl 130, both products of Hüls AG (butadiene homopolymers containing approx. 99% 1,4-cis- or 1,4-trans bonds and approx. 1% 1,2-vinyl structure), Nisso-Pb® 1000, Pb 2000, Pb 3000, products of Nippon Soda Co., Ltd (butadiene homopolymers having more than 85% 1,2-vinyl structure), Lithene® Al, AH, PL, PM, PH, PM-N, PN-2000, PH-4, products of Chemetall GmbH (butadiene homopolymers having 20 to 50% vinyl structure, 0 to 20% cyclic components and 20 to 80% 1,4-cis- or 1,4-trans-bonds).

Preferred components (A) are those in which
(a) 3 to 45% by weight and preferably 7 to 30% by weight maleic anhydride,
(b) 8 to 60% by weight and preferably 10 to 50% by weight monomers corresponding the formulae

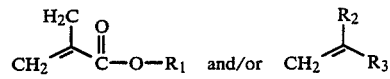

and
(c) 20 to 70% by weight and preferably 25 to 60% by weight monomers corresponding to the following formula

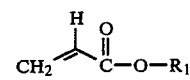

are present in copolymerized form.

Particularly preferred copolymers for component (A) are those in which, optionally in addition to other monomers, 0 to 140 parts by weight per 100 parts by weight maleic anhydride of other monomers selected from the group comprising styrene, vinyltoluene, α-methyl styrene, α-ethyl styrene, nucleus-substituted diethyl styrenes, isopropyl styrenes, butyl styrenes and methoxy styrenes optionally in the form of isomer mixtures, ethyl vinyl ether, n-propyl vinyl ether, isopropyl vinyl ether, n-butyl vinyl ether, isobutyl vinyl ether, vinyl acetate, vinyl propionate, vinyl butyrate and mixtures of these monomers are present in copolymerized form.

Component (A), i.e. the maleic anhydride copolymers, have a weight-average molecular weight of 1500 to 75 000 and preferably of 4500 to 35 000. They are produced in known manner by radically initiated copolymerization, preferably in the presence of organic solvents. The polymerization medium used may be any of the solvents normally used in the lacquer industry which are inert to the monomers and to the copolymers under the polymerization conditions. Suitable solvents are, for example, esters, such as ethyl acetate, propyl acetate, butyl acetate, isopropyl acetate, isobutyl acetate, sec.-butyl acetate, amyl acetate, hexyl acetate, benzyl acetate, ethyl propionate, butyl propionate, methyl glycol acetate, ethyl glycol acetate, butyl glycol acetate, ethyl diglycol acetate, methyl diglycol acetate, butyl diglycol acetate, butyrolactone, propylene glycol methyl ether acetate, for example ethers, such as diisopropyl ether, dibutyl ether, tetrahydrofuran, dioxane, dimethyl diglycol, hydrocarbons, such as gasoline, turpentine oil, solvent naphtha, terpenes, hexane, heptane, octane, cyclohexane, toluene, xylene, ethylbenzene, ketones, such as acetone, methyl ethyl ketone, methyl isobutyl ketone, methyl n-amyl ketone, methyl isoamyl ketone, diethyl ketone, ethyl butyl ketone, diisopropyl ketone, cyclohexanone, methyl cyclohexanone, isophorone or mixtures of these solvents.

The copolymerization is normally carried out at solids contents of 30 to 95% by weight.

In general, part of the solvent or the total quantity of solvent is initially introduced into the reaction vessel and the monomer mixture, initiator and, optionally, part of the solvent continuously introduced. After the addition, the polymerization mixture is stirred for a while. The polymerization is terminated after a monomer conversion of more than 96% and preferably more than 99%. It may be necessary for the polymerization mixture to be reactivated by subsequent addition of small quantities of initiator to achieve the desired monomer conversion. With certain starting monomer compositions, it is possible that, after the polymerization, the copolymer may contain relatively large quantities of residual maleic anhydride monomers. For reasons of cost and in cases where this may adversely affect the application envisaged or rather the property level, it is of advantage to reduce this residual monomer content either by distillation or by reactivation with initiator, optionally with simultaneous addition of small quantities of a monomer mixture readily copolymerizable with maleic anhydride, such as for example styrene, butyl acrylate.

The monomer conversion is determined by determination of the solids content of the reaction mixture and is monitored by residual monomer analysis by gas chromatography.

The radical formers preferably used are those suitable for reaction temperatures of 60° to 180° C., such as organic peroxides, for example dibenzoyl peroxide, di-tert -butyl peroxide, dilauryl peroxide, tert.-butyl peroxy-2-ethyl hexanoate, tert.-butyl peroxymaleate, tert.-butyl peroxybenzoate, dicumyl peroxide, didecanoyl peroxide, and azo compounds, for example 2,2'-azo-bis-(2,4-dimethyl valeronitrile), 2,2'-azobis-(isobutyronitrile), 2,2'-azobis-(2,3-dimethyl butyronitrile), 1,1'-azobis-(1-cyclohexanenitrile).

The initiators may be used in quantities of 0.5 to by weight, based on total monomers. Molecular weight regulators, such as n-dodecyl mercaptan, tert.-dodecyl mercaptan, mercaptoethanol, etc , may also be used in quantities of from 0 to 10% by weight.

Component (B) consists of organic polyamines exclusively containing aliphatic and/or cycloaliphatically bound primary amino groups which are entirely present in aldimine- and/or ketimine-blocked form. Accordingly, the organic polyamines in question are compounds containing at least two functional groups having the following structure

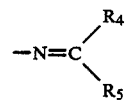

in which $R_4$ and $R_5$ may be the same or different and represent hydrogen or inert organic radicals, more especially aliphatic $C_1$–$C_{18}$ and preferably $C_1$–$C_8$ hydrocarbon radicals which may also be attached together with the carbon atom to form a cycloaliphatic ring, more especially a cyclohexane ring.

These blocked polyamines are prepared in known manner by reaction of corresponding aldehydes or ketones corresponding to the following formula

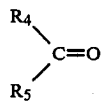

which preferably have a molecular weight of 72 to 200 (ketones) or 58 to 128 (aldehydes), with suitable polyamines of the type mentioned hereinafter.

Suitable aldehydes are, for example, formaldehyde, acetaldehyde, propionaldehyde, butyraldehyde, isobutyraldehyde, trimethyl acetaldehyde, 2,2-dimethyl propanal, 2-ethyl hexanal, 3-cyclohexene-1-carboxaldehyde, hexanal, heptanal, octanal, valeraldehyde, benzaldehyde, tetrahydrobenzaldehyde, hexahydrobenzaldehyde, acrolein, croton aldehyde, propargyl aldehyde, p-tolyl aldehyde, phenyl ethanal, 2-methyl pentanal, 3-methyl pentanal, 4-methyl pentanal, sorbic aldehyde. Particularly preferred aldehydes are butyraldehyde, isobutyraldehyde, trimethyl acetaldehyde, 2,2-dimethyl propanal, 2-ethyl hexanal, 3-cyclohexene-1-carboxaldehyde and hexahydrobenzaldehyde.

Suitable ketones are, for example, acetone, methyl ethyl ketone, methyl propyl ketone, methyl isopropyl ketone, methyl butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone, diisobutyl ketone, cyclohexanone, cyclopentanone, methyl cyclohexanone, isophorone, methyl-tert.-butyl ketone, 5-methyl-3-heptanone, 4-heptyl ketone, 1-phenyl-2-propanone, acetophenone, methyl nonyl ketone, dinonyl ketone, 3,3,5-trimethyl cyclohexanone.

Preferred ketones are those which have a boiling point below 170° C. and which are readily volatile at room temperature. Particularly preferred ketones are methyl isobutyl ketone, methyl isopropyl ketone, diethyl ketone, diisobutyl ketone, methyl tert.-butyl ketone.

It is of course also possible to use mixtures of different ketones or aldehydes and also mixtures of ketones with aldehydes to obtain special properties.

The polyamines used for the preparation of component (B) are, in particular, organic compounds containing at least two aliphatically and/or cycloaliphatically bound primary amino groups Although polyamines containing aromatically bound amino groups may also be used, they are less preferred. The polyamines generally have a molecular weight of 60 to 500 and preferably of 88 to 400, although amino-terminated Prepolymers of higher molecular weight may also be used as polyamine component in the preparation of component (B).

Particularly preferred polyamines are diprimary aliphatic or cycloaliphatic diamines such as, for example, ethylenediamine, propylenediamine, tetramethylenediamine, trimethylenediamine, hexamethylenediamine, isophoronediamine, bis-(4-aminocyclohexyl)-methane, bisaminomethyl hexahydro-4,7-methane indane, 1,4-cyclohexanediamine, 1,3-cyclohexane diamine, 2-methyl cyclohexanediamine, 4-methyl cyclohexanediamine, 2,2,5-trimethyl hexanediamine, 2,2,4-trimethyl hexanediamine, 1,4-butanediol-bis-(3-aminopropyl)-ether, 2,5-diamino-2,5-dimethyl hexane, bisaminomethyl cyclohexane, bis-(4-amino-3,5-dimethyl cyclohexyl)-methane or mixtures thereof.

Among these particularly preferred polyamines, tetramethylenediamine, hexamethylenediamine, isophoronediamine, bis-aminomethyl cyclohexane, 1,4-cyclohexanediamine, bisaminomethyl hexahydro-4,7-methane indane and bis-(4-aminocyclohexyl)-methane are especially preferred.

In addition to these preferred diamines, prepolymers containing terminal primary amino groups, i.e. compounds containing at least two terminal amino groups and having a molecular weight of 500 to 5000 and preferably of 500 to 2000, may also be used in the preparation of component (B) These compounds include, for example, the aminopolyethers known per se from Polyurethane chemistry of the type described, for example, in EP-A-0 081 701, or reaction products—containing for example amide, urea, urethane or secondary amino groups—of at least difunctional carboxylic acids, isocyanates or epoxides with diamines of the type mentioned by way of example above, these reaction products still containing at least two primary amino groups. Mixtures of these relatively high molecular weight polyamines with the low molecular weight polyamines mentioned by way of example may also be used for the preparation of component (B).

The aromatic polyamines which are also suitable in principle, but less preferred, for the preparation of component (B) include, for example, 2,4- and 2,6-diaminotoluene, 1,4-diaminobenzene or 4,4'-diaminodiphenylmethane.

Component (B) is prepared by reaction of the starting components in an equivalent ratio of amino groups to aldehyde groups or ketone groups of 1:1 to 1:1.5. Catalytic quantities of other substances, such as for example ptoluene sulfonic acid, hydrogen chloride, sulfuric acid or aluminium chloride, may optionally be used to accelerate the reaction.

The reaction generally takes place at a temperature in the range from 75° to 180° C., the reaction being carried out in the presence of an entraining agent to remove the water of reaction until the calculated quantity (approx. 1 mole water per mole primary amino groups) has been eliminated or until the elimination of water stops. The entraining agent and any unreacted starting materials still present are then removed by distillation. Suitable entraining agents are, for example, toluene, xylene, cyclohexane, octane.

The crude products thus obtained may be used without further purification as component (B) in the process according to the invention for the production of the binder components.

A variant of the production of components (B) suitable for the purposes of the invention is characterized for example by the use as amine component of polyamines containing at least one secondary amino group in addition to at least two primary amino groups. Polyamines such as these include, for example, diethylenetriamine, triethylenetetramine, tetraethylenepentamine, dipropylenetriamine or tripropylenetetraamine. As already described, these amines may also be converted with aldehydes and/or ketones into polyamines containing blocked primary amino groups maintaining an equivalent ratio of primary amino groups to aldehyde or keto groups of 1:1. The remaining secondary amino groups may then be converted into urea groups, for example by reaction with diisocyanates such as, for example, isophorone diisocyanate or hexamethylene diisocyanate, optionally with branching of the molecules The products thus obtained are also polyamines containing blocked primary amino groups which may be used as component (B) in the binder combinations according to the invention.

Component (C) optionally present in addition to components (A) and (B) in the binder compositions according to the invention consists of amide-group-containing reaction products of maleic acid copolymers of the component (A) type with organic polyamines containing in all at least two primary and secondary, preferably only primary, preferably aliphatically or cycloaliphatically bound amino groups present partly as free amino groups and partly in aldimine- and/or ketimine-blocked form. These partially blocked polyamines contain (on a statistical average) at most one free primary or secondary, preferably primary, amino primary amino group. Suitable partially blocked polyamines such as these are, for example, the reaction products described earlier on of polyamines containing secondary amino groups in addition to two primary amino groups with aldehydes and/or ketones or partially blocked primary polyamines which have been prepared in accordance with the foregoing observations maintaining an equivalent ratio of primary amino groups to aldehyde or keto groups of greater than 1:1, i.e. of up to about 1.5:1.

Binder compositions according to the invention containing components (C) in addition to components (A) and (B) may be produced, for example, by preparing a mixture of components (A) and (B) and partially blocked polyamines of the type mentioned, the free amino groups reacting off spontaneously with part of component (A) to form component (C).

However, these special binder compositions according to the invention may also be prepared by mixing component (A) with a partially blocked polyamine exclusively containing primary amino groups of the type obtained by reaction of primary polyamines with subequivalent quantities of aldehydes and/or ketones. Because partially blocked polyamines such as these are statistical mixtures in which completely blocked polyamines are also present, the completely blocked polyamines form component (B) of the mixture obtained while the partially blocked components of the polyamine mixture react off spontaneously with part of component (A) to form component (C).

In all variants of the production of the binder compositions according to the invention, the quantitative ratios between the starting materials used for the production of the combinations is selected so that, including the spontaneous reaction possibly taking place between anhydride groups and free amino groups, the binder combinations ultimately obtained contain 0.25 to 5, preferably 0.5 to 2 and more preferably 0.9 to 1.3 blocked amino groups for each anhydride group, 0 to 25 equivalent percent of the blocked amino groups consisting of blocked amino groups present in optional component (C). The binder combinations according to the invention contain 60 to 95 parts by weight of component (A), 5 to 40 parts by weight of component (B) and 0 to 25 parts by weight of component C).

Mixtures of different individual components (A), (B) and, optionally, component (C) may of course be used in the production of the binder compositions according to the invention.

Inert organic solvents or diluents of the type already mentioned by way of example in the foregoing may be added to the binder combinations according to the invention before, during or after their production by mixing of the individual components. These solvents or diluents may even be present during the preparation of one or more starting components, as described for example in the foregoing with reference to the preparation of the maleic anhydride copolymers according to the invention. The solvents or diluents should be largely anhydrous to ensure an adequate processing time of the mixtures. Solvents or diluents are generally used in the quantities required to establish suitable processing viscosities of the combinations according to the invention. The solids content of the combinations according to the invention is generally between 40 and 80%. However, it is also possible in principle further to reduce the solvent or diluent content by using suitable low molecular weight maleic anhydride copolymers.

The compositions according to the invention are generally mixtures liquid at room temperature which show adequate stability in storage in the absence of water and, after application to a substrate, harden quickly in the presence of atmospheric moisture.

In general, films actually crosslinked at room temperature are obtained. The basically very rapid hardening may be further accelerated by drying at elevated temperatures. Temperatures of 80° to 130° C. and drying times of 10 to 30 minutes are advantageous.

Where particularly hydrolysis-stable polyketimines, polyaldimines or polyketaldimines are used, this forced drying at elevated temperatures may be necessary to obtain the optimal product spectrum.

The lacquers, coating compositions and sealing compounds in which the binder compositions according to the invention are present as binders and which are to be used in accordance with the invention may contain the auxiliaries and additives normally used in lacquer technology, such as for example pigments, fillers, levelling aids, antioxidants or UV absorbers. These auxiliaries and additives should be anhydrous and are incorporated in the starting components, generally component (A), preferably before the process according to the invention is carried out.

The lacquers, coating compositions and sealing compounds containing the compositions according to the invention as binders generally have a pot life of 3 to 72 hours in the absence of moisture. However, their pot life may be lengthened or shortened as required by selecting suitable reactants. The lacquers, coating compositions and sealing compounds may be applied to any, optionally pretreated substrates, such as for example metal, wood, glass, ceramic, stone, concrete, plastics, fabrics, leather, cardboard or paper, by any of the usual methods, for example by spray coating, spread coating, dip coating, flood coating, casting, roll coating.

In the following Examples, all percentages and parts are by weight, unless otherwise indicated.

EXAMPLES

I Preparation of the maleic anhydride copolymers A

General procedure for preparing the maleic acid anhydride copolymers $A_1$–$A_6$:

Part I is initially introduced into a 4-liter reaction vessel equipped with a stirring, cooling and heating system, heated to the reaction temperature and part II added over a period of 2 hours and part III over a period of 2.5 hours, followed by stirring for 3 hours.

The reaction temperatures and the composition of parts I–III are shown in Table 1 together with the solids content and viscosity of the maleic anhydride copolymer solutions obtained.

TABLE 1

| | (Quantities in g) | | | | | |
|---|---|---|---|---|---|---|
| | $A_1$ | $A_2$ | $A_3$ | $A_4$ | $A_5$ | $A_6$ |
| Part I | | | | | | |
| Butyl acetate | 1050 | 1050 | 1050 | 1050 | 700 | 600 |
| Part II | | | | | | |
| 2-Ethyl hexylacrylate | | | | | | 217 |
| Methyl methacrylate | 859 | 658 | 554 | 300 | 463 | 493 |
| Styrene | 313 | 213 | 160 | 213 | 173 | 226 |
| Butyl acrylate | 300 | 600 | 831 | 958 | 255 | |
| Maleic anhydride | 284 | 284 | 210 | 284 | 174 | 205 |
| Polybutadiene Nisso B 1000 | | | | | 93 | |
| Butyl vinyl ether | | | | | | 125 |
| t-dodecylmercaptan | | | | | 50 | |
| Part III | | | | | | |
| Tert.-butyl peroctoate[1] | 105 | 105 | 105 | 105 | 17 | 75 |
| Butyl acetate | 89 | 90 | 90 | 90 | 75 | 57 |
| Reaction temperature (°C.) | 115 | 110 | 110 | 110 | 120 | 121 |
| Diluted with butyl acetate | 271 | | | | | 119 |
| Solids content (%) | 55.2 | 60.1 | 60.4 | 60.6 | 59.5 | 61.2 |
| Viscosity (mPa.s)[2] | 11120 | 13090 | 3350 | 1950 | 16360 | 18320 |

[1] tert.-butyl peroctoate is used in the form of a 70% solution in a mixture of hydrocarbons
[2] measured at 23° C.

General procedure for the preparation of maleic anhydride copolymers $A_7$–$A_{14}$:

Part I is initially introduced into a 4-liter reaction vessel equipped with a stirring, cooling and heating system, heated to the reaction temperature and parts II, III and IV added simultaneously over periods of 3, 3 and 4 hours, respectively, followed by stirring for 1 hour. The various mixtures were then distilled. The reaction temperatures and the composition of parts I to IV are shown in Table 2 together with the solids content and viscosity of the maleic anhydride copolymers obtained.

TABLE 2

| | (Quantities in g) | | | | | | | |
|---|---|---|---|---|---|---|---|---|
| | $A_7$ | $A_8$ | $A_9$ | $A_{10}$ | $A_{11}$ | $A_{12}$ | $A_{13}$ | $A_{14}$ |
| Part I | | | | | | | | |
| Xylene | 900 | | | | | 1360 | | |
| Methoxypropyl acetate | | 737.5 | 900 | 1450 | 1200 | | 500 | 1200 |

TABLE 2-continued

| | (Quantities in g) | | | | | | | |
|---|---|---|---|---|---|---|---|---|
| | $A_7$ | $A_8$ | $A_9$ | $A_{10}$ | $A_{11}$ | $A_{12}$ | $A_{13}$ | $A_{14}$ |
| Part II | | | | | | | | |
| Styrene | 250 | 262.5 | 50 | 450 | 450 | 300 | 187.5 | 450 |
| Methyl methacrylate | | | 100 | | | | | |
| Butyl acrylate | 500 | | | 675 | | 1100 | 1125 | 675 |
| Ethyl acrylate | | | 350 | | | | | |
| 2-Ethyl hexylacrylate | | 225 | 100 | | 675 | | | |
| Vinyl toluene | | | 50 | | | | | |
| α-methyl styrene | | | 150 | | | | | |
| Polybutadiene Polyol 110 | 100 | | | | | | | |
| n-Dodecyl mercaptan | 30 | | | 1.5 | 1.5 | 2 | | |
| t-Dodecyl mercaptan | | 3.75 | 10 | | | | | |
| Part III | | | | | | | | |
| Maleic anhydride | 150 | 262.2 | 200 | 375 | 375 | 600 | 187.5 | 375 |
| Part IV | | | | | | | | |
| Di-tert.-butyl peroxide | 10 | 24.1 | | | | | | |
| Tert.-butyl peroctoate (70%) | | | 20 | 42.9 | 42.9 | 57.1 | | |
| Xylene | 100 | | | | | 57 | | |
| Methoxypropyl acetate | | 38.8 | 100 | 68.6 | 40 | | 57.5 | 330 |
| Azodiisobutyronitrile | | | | | | | 43.5 | 30 |
| Reaction temperature (°C.) | 136 | 144 | 120 | 130 | 130 | 130 | 122 | 130 |
| Solids content (%) | 50.0 | 52.4 | 50.3 | 50.2 | 54.1 | 61.6 | 60.4 | 49.3 |
| Distilled to solids (%) | | | | 60.7 | 58.9 | | 65.4 | 55.7 |
| Viscosity (mPa.s) | 300 | 5210 | 790 | 56300 | 32900 | 152900 | 1370 | 18700 |

General procedure for the preparation of maleic anhydride copolymers $A_{15}$–$A_{17}$:

Part I is initially introduced into a 4-liter reaction vessel equipped with a stirring, cooling and heating system and heated to the reaction temperature. Part II and Part III are then continuously introduced over a period of 3 hours while part IV is added in portions over a period of 4 hours, followed by stirring for 2 hours.

The reaction temperature and the composition of parts I–IV are shown in Table 3 together with the solids and viscosity of the maleic anhydride copolymer solutions obtained.

TABLE 3

| | (Quantities in g) | | |
|---|---|---|---|
| | $A_{15}$ | $A_{16}$ | $A_{17}$ |
| Part I | | | |
| Butyl acetate | | 680 | 780 |
| Methoxypropyl acetate | 1000 | | |
| Part II | | | |
| Methyl methacrylate | 600 | | 117 |
| Styrene | 30 | 266 | 209 |
| Butyl acrylate | 327.5 | | 363 |
| Hexanediol bisacrylate | 2.5 | | |
| Ethyl acrylate | | 621 | |
| Acrylonitrile | | | 176 |
| N-methoxymethyl acrylamide | | | 117 |
| Maleic anhydride | | 253 | 189 |
| n-Dodecyl mercaptan | 10 | | |
| Vinyl acetate | | | 127 |
| Part III | | | |
| Maleic anhydride | 40 | | |
| Part IV | | | |
| Azodiisobutyronitrile | 20 | 53 | 49 |
| Reaction temperature (°C.) | 120 | 80 | 80 |
| Solids content (%) | 49.0 | 64.3 | 59.4 |
| Diluted with butyl acetate | | 598 | 474 |
| to solids content (%) | | 50.8 | 49.3 |
| Viscosity (mPa.s) | 570 | 11450 | 20610 |

II Preparation of the polyketimines, polyaldimines or polyketaldimines B

General procedure

To prepare the polyketimines, polyaldimines or polyketaldimines, the at least difunctional amines and also the ketones and/or aldehydes and, optionally, the entraining agent are mixed and approximately 0.01% to 0.1% p-toluene sulfonic acid optionally added as catalyst. The reaction mixture is then heated under reflux in an inert gas atmosphere (for example nitrogen, argon) on a water separator until the theoretical quantity of water has been eliminated or until the elimination of water stops. The entraining agent and excess or unreacted blocking agent are then distilled off. The products thus obtained are directly used for the combinations according to the invention without any further purification or separation steps.

B 1

The bisketimine B 1 is obtained as crude product from 170 g 3-aminomethyl-3,3,5-trimethyl cyclohexane amine (isophoronediamine), 355 g diisobutyl ketone and 175 g toluene after separation of 30 g water (theoretical quantity: 36 g) at 140° C. and subsequent removal of excess ketone and toluene by distillation.

B 2

The bisketimine B 2 is obtained as crude product from 170 g isophoronediamine, 280 g 1-methyl cyclohexanone and 150 g toluene after separation of 35.5 g water (theoretical quantity 36 g) at 138° C. and subsequent removal of excess ketone and toluene by distillation.

B 3

The bisketimine B 3 is obtained as crude product from 170 g isophoronediamine, 250 g tert.-butyl methyl ketone and 140 g toluene after separation of 33 g water (theoretical quantity: 36 g) at 120° C. and subsequent removal of excess ketone and toluene by distillation.

B 4

The bisketimine B 4 is obtained as crude product from 170 g isophoronediamine, 320 g 5-methyl-3-heptanone and 163 g toluene after separation of 35.5 g water (theoretical quantity: 36 g) at 134° C. and subsequent removal of ketone and toluene by distillation.

B 5

The crude bisketimine B 5 is obtained from 170 g isophoronediamine, 285 g 4-heptanone and 152 g toluene after separation of 32 g water (theoretical quantity 36 g) at 132° C. and subsequent distillation.

B 6

The crude bisketimine B 6 is obtained from 170 g isophoronediamine, 285 g 5-methyl-2-hexanone and 152 g toluene after separation of 49 g water (theoretical quantity: 36 g) at 142° C. and subsequent distillation.

B 7

The crude bisketimine B 7 is obtained from 170 g isophoronediamine, 215 g methyl isopropyl ketone and 128 g toluene after separation of 35.5 g water (theoretical quantity 36 g) at 115° C. and subsequent distillation.

B 8

The crude bisaldimine B 8 is obtained from 170 g isophoronediamine, 180 g isobutyraldehyde and 117 g toluene after separation of 35 g water (theoretical quantity 36 g) at 126° C. and subsequent distillation.

B 9

The crude bisaldimine B 9 is obtained from 170 g isophoronediamine, 275 g 3-cyclohexene-1-carboxaldehyde and 148 g toluene after separation of 35.5 g water (theoretical quantity: 36 g) at 126° C. and subsequent distillation.

B 10

The crude bisaldimine B 10 is obtained from 170 g isophoronediamine, 320 g 2-ethyl hexanal and 163 g toluene after separation of 35.5 g water (theoretical quantity 36g) at 138° C. and subsequent distillation.

B 11

The crude bisaldimine B 11 is obtained from 170 g isophoronediamine, 215 g 2,2-dimethylpropanal and 128 g toluene after separation of 44 g water (theoretical quantity: 36 g) at 110° C. and subsequent distillation.

B 12

The crude bisketimine B 12 is obtained from 58 g hexamethylenediamine, 110 g methyisobutyl ketone and 168 g toluene after separation of 16 g water (theoretical quantity: 18 g) at 118° C. and subsequent distillation.

B 13

The crude bisketimine B 13 is obtained from 116 g hexamethylenediamine, 245 g cyclohexanone and 120 g toluene after separation of 37.5 g water (theoretical quantity 36 g) at 130° C. and subsequent distillation.

B 14

The crude bisaldimine B 14 is obtained from 116 g hexamethylenediamine, 275 g 3-cyclohexene-1-carboxaldehyde and 130 g toluene after separation of 41 g water (theoretical quantity: 36 g) at 136° C. and subsequent distillation.

B 15

The crude bisketimine B 15 is obtained from 93.8 g hexamethylenediamine, 287 g diisobutyl ketone and 157 g toluene after separation of 24.5 g water (theoretical quantity 29 g) at 138° C. and subsequent distillation.

B 16

The crude bisketimine B 16 is obtained from 116 g hexamethylenediamine, 250 g tert.-butyl methyl ketone and 122 g toluene after separation of 35 g water (theoretical quantity: 36 g) at 118° C. and subsequent distillation.

B 17

The crude bisketimine B 17 is obtained from 680 g isophoronediamine, 1000 g methyl isobutyl ketone and 560 g toluene after separation of 146 g water (theoretical quantity: 144 g) at 120° C. and subsequent distillation.

B 18

The crude bisketimine B 18 is obtained from 204 g 1,4-butanediol-bis-(3-aminopropyl ether), 250 g methyl isobutyl ketone and 151 g toluene after separation of 31 g water (theoretical quantity 36 g) at 121° C. and subsequent distillation.

B 19

The crude bisketimine B 19 is obtained from 210 g bis-(4-aminocyclohexyl)-methane, 250 g methyl isobutyl ketone and 153 g toluene after separation of 28 g water (theoretical quantity 36 g) at 130° C. and subsequent distillation.

B 20

The crude bisketimine B 20 is obtained from 150 g isophoronediamine, 190 g diethyl ketone and 113 g toluene after separation of 26 g water (theoretical quantity: 31.7 g) at 131° C. and subsequent distillation.

B 21

The crude bisketimine B 21 is obtained from 194 g bisaminomethyl hexahydro-4,7-methane indane, 250 g methyl isobutyl ketone and 148 g toluene after separation of 52 g water (theoretical quantity 36 g) at 125° C. and subsequent distillation.

B 22

The crude bisaldimine B 22 is obtained from 144 g 2,5-diamino-2,5-dimethyl hexane, 320 g 2-ethyl hexanal and 155 g toluene after separation of 34.5 g water (theoretical quantity 36 g) at 138° C. and subsequent distillation.

B 23

The crude bisketimine B 23 is obtained from 198 g bis-(4-aminophenyl)-methane, 250 g methyl isobutyl ketone and 149 g toluene after separation of 18 g water (theoretical quantity, 36 g) at 117° C. and subsequent distillation.

B 24

The crude ketaldimine B 24 is obtained from 170 g isophoronediamine, 125 g methyl isobutyl ketone, 160 g 2-ethyl hexanal and 152 g toluene after separation of 32.7 g water (theoretical quantity: 36 g) at 135° C. and subsequent distillation.

B 25

The crude ketaldimine B 25 is obtained from 116 g hexamethylenediamine, 125 g methyl isobutyl ketone, 160 g 2-ethyl hexanal and 134 g toluene after separation of 37.7 g water (theoretical quantity 36 g) at 128° C. and subsequent distillation.

B 26

The crude mixed bisketimine B 26 is obtained from 194 g bis-aminomethyl-hexahydro-4,7-methane indane, 90 g methyl ethyl ketone, 107.5 g methyl isobutyl ketone and 130.5 g toluene after separation of 48.4 g water (theoretical quantity: 36 g) at 112° C. and subsequent distillation.

B 27

A bisketimine still containing a free secondary amino group is obtained from 103 g diethylenetriamine. 250 g methyl isobutyl ketone and 151 g toluene after separation of 35 g water (theoretical quantity: 36 g) at 126° C. In contrast to the general preparation procedure, excess ketone or toluene are only partly distilled off and 84 g hexamethylene diisocyanate subsequently added slowly at room temperature. The temperature is kept at 30° C. by cooling with an ice bath. A reaction product of bisketimine and diisocyanate in a molar ratio of 2:1 and hence a tetrafunctional ketimine containing urea bonds in the molecule are thus obtained.

III Preparation of the binder compositions according to the invention

The maleic anhydride copolymers A and polyketimines, polyaldimines or polyketaldimines B are mixed together at room temperature and adjusted as required to a processing viscosity by addition of an organic solvent or diluent. Using a film drawer, the films are applied to glass plates in a wet film thickness of 120 to 150 $\mu$m. The films applied at room temperature had all dried, i.e. were tack-free, after 90 minutes at the latest. Crosslinkable, clear films having very good mechanical properties are obtained after ageing, i.e. after drying for 16 to 20 hours at room temperature. Various films were dried in an oven for 20 minutes at 100° C. and then evaluated.

Table 4 below shows the compositions of the binder combinations, the drying temperatures, the solids contents and initial viscosities and viscosity behavior and also the solvent resistance as a measure of crosslinking.

The solvent resistance is determined by a wiping test using a cotton wool plug impregnated with methyl isobutyl ketone (MIBK) The result of this test is expressed as the number of double wipes after which the film shows no visible change.

The solids contents of the binder compositions were determined by calculation on the basis of the experimentally determined solids contents of the maleic anhydride copolymers and on the assumption that the polyketimines/polyaldimines/polyketaldimines have a solids content of approximately 95%.

TABLE 4

| | (Examples) | | | | | | |
|---|---|---|---|---|---|---|---|
| | 1 | 2 | 3 | 4 | 5 | 6 | 7 |
| MA copolymer | 110 g $A_1$ | 100 g $A_2$ | 100 g $A_3$ | 100 g $A_4$ | 100 g $A_{12}$ | 100 g $A_{10}$ | 100 g $A_{11}$ |
| Crosslinker | 13.0 g $B_{16}$ | 15.8 g $B_{16}$ | 15.9 g $B_{16}$ | 15.9 g $B_{16}$ | 16.2 g $B_{16}$ | 16.0 g $B_{16}$ | 15.5 g $B_{16}$ |
| Diluent: | | | | | | | |
| Methoxypropyl acetate | | | | | | 16.7 g | 15.7 g |
| Butyl acetate | 11.7 g | 12.3 g | — | — | — | | |
| Xylene | | | | | | 20.8 g | |
| Solids content of the binder combination | 54.0% | 58.6% | 65.0% | 65.0% | 56.1% | 57.2% | 56.1% |
| Initial viscosity (mPa.s) | 2550 | 1980 | 1140 | 1140 | 700 | 2110 | 2050 |
| Viscosity after | | | | | | | |
| 5–6 hours (mPa.s) | 2710 | 2180 | 2380 | 1200 | 900 | 2750 | 2750 |
| 24 hours (mPa.s) | 3450 | 2930 | 3030 | 1580 | 1270 | 3450 | 3200 |
| Appearance of the film | colorless | colorless | colorless | colorless | yellow tinges | colorless | colorless |
| MIBK wiping test (after storage for 16–20 hours at room temperature) | >200 | >200 | >200 | >200 | >100 | >200 | >100 |

| | 8 | 9 | 10 | 11 | 12 | 13 | 14 | 15 |
|---|---|---|---|---|---|---|---|---|
| MA copolymer | 100 g $A_{14}$ | 100 g $A_{13}$ | 100 g $A_5$ | 100 g $A_6$ | 100 g $A_7$ | 100 g $A_9$ | 100 g $A_{13}$ | 100 g $A_{14}$ |
| Crosslinker | 14.6 g $B_{16}$ | 17.2 g $B_{16}$ | 15.7 g $B_{16}$ | 16.2 g $B_{16}$ | 13.1 g $B_{16}$ | 13.2 g $B_{16}$ | 7.6 g $B_{16}$ | 25.1 g $B_{16}$ |
| Diluent: | | | | | | | | |
| Methoxypropyl acetate | 10.0 g | — | | | | | | 15 g |
| Butyl acetate | | 11 g | 12 g | — | — | — | — | |
| Solids content of the binder combination | 55.9% | 69.7% | 59.4% | 59.7% | 55.2% | 55.6% | 67.5% | 56.8% |
| Initial viscosity (mPa.s) | 1440 | 770 | 2040 | 2210 | 270 | 800 | 1500 | 4560 |
| Viscosity after | | | | | | | | |
| 5–6 hours (mPa.s) | 6300 | 870 | 2240 | 2280 | 270 | 940 | 1400 | 4920 |
| 24 hours (mPa.s) | 7740 | 900 | | | | | 1340 | 5540 |
| 3 days (mPa.s) | | | 4700 | 6800 | 440 | 1940 | | |
| Appearance of the film | colorless | colorless | colorless | colorless | colorless | colorless | colorless | colorless |
| MIBK wiping test (after storage for 16–20 hours at room temperature) | >200 | >100 | >100 | >100 | >100 | >100 | >50 | >100 |

| | 16 | 17 | 18 | 19 | 20 | 21 | 22 | 23 |
|---|---|---|---|---|---|---|---|---|
| MA copolymer | 100 g $A_2$ | 100 g $A_8$ | 50 g $A_8$ 50 g $A_{15}$ | 100 g $A_{16}$ | 100 g $A_{17}$ | 60 g $A_{14}$ | 60 g $A_1$ | 60 g $A_1$ |
| Crosslinker | 27.1 g $B_{16}$ | 13.8 g $B_{16}$ | 13.3 g $B_{16}$ | 13.3 g $B_{26}$ | 13.0 g $B_{16}$ | 17.3 g $B_{16}$ | 8.4 g $B_{16}$ | 11.0 g $B_{15}$ |
| Diluent: | | | | | | | | |
| Methoxypropyl acetate | | 5.6 g | — | | 7 g | | | |

TABLE 4-continued (Examples)

|  |  |  |  |  |  |  |  |  |
|---|---|---|---|---|---|---|---|---|
| Butyl acetate | 13.4 g |  |  | 31.6 g | 17.0 g |  | 4.7 g | 6 g |
| Solids content of the binder combination | 61.0% | 54.9% | 55.9% | 43.8% | 43.3% | 60.0% | 65.1% | 56.3% |
| Initial viscosity (mPa.s) | 2280 | 2080 | 1200 | 5200 | 8830 | 3240 | 5020 | 10800 |
| Viscosity after |  |  |  |  |  |  |  |  |
| 5–6 hours (mPa.s) | 2450 | 3140 | 1440 | 20010 | gels | 3560 | 5710 | 28100 |
| 24 hours (mPa.s) | 2620 | 4500 | 1750 | gels |  | 5020 | 5650 | gels |
| Appearance of the film | colorless | yellow tinges | colorless | colorless | colorless | colorless | colorless | colorless |
| MIBK wiping test (after storage for 16–20 hours at room temperature) | >100 | >100 | >50 (after 20 mins. at 100° C.) | >100 | >100 | >100 | >100 | >100 |

|  | 24 | 25 | 26 | 27 | 28 | 29 | 30 | 31 |
|---|---|---|---|---|---|---|---|---|
| MA copolymer | 60 g $A_{14}$ | 60 g $A_{14}$ | 60 g $A_{14}$ | 60 g $A_1$ | 60 g $A_2$ | 60 g $A_2$ | 60 g $A_2$ | 60 g $A_2$ |
| Crosslinker | 17.5 g $B_6$ | 17.2 g $B_9$ | 17.3 g $B_2$ | 11.1 g $B_{18}$ | 12.0 g $B_{19}$ | 9.5 g $B_{20}$ | 11.8 g $B_{21}$ | 10.8 g $B_{26}$ |
| Diluent: |  |  |  |  |  |  |  |  |
| Methoxypropyl acetate | 3.7 g | 3.7 g | 7.0 g |  |  |  |  |  |
| Butyl acetate |  |  |  | 6.9 g | 7.0 g | 7.0 g | 7.0 g | 7.0 g |
| Xylene |  |  |  |  |  |  |  |  |
| Solids content of the binder combination | 62.4% | 62.6% | 60.0% | 55.8% | 60.0% | 58.8% | 59.9% | 59.5% |
| Initial viscosity (mPa.s) | 3970 | 1300 | 3240 | 2250 | 1700 | 4410 | 3120 | 4790 |
| Viscosity after |  |  |  |  |  |  |  |  |
| 5–6 hours (mPa.s) | 17150 | 4080 | 3560 | 13500 | 24000 | 5130 | 8050 | 23720 |
| 24 hours (mPa.s) | gels | 4190 | 5020 | gels | gels | 6280 | gels | gels |
| Appearance of the film | yellow tinges | colorless | colorless | colorless | colorless | colorless | colorless | colorless |
| MIBK wiping test (after storage for 16–20 hours at room temperature) | >100 | >50 | >100 | >100 | >100 | >100 | >100 | >100 |

|  | 32 | 33 | 34 | 35 | 36 | 37 | 38 | 39 |
|---|---|---|---|---|---|---|---|---|
| MA copolymer | 60 g $A_{14}$ | 60 g $A_{13}$ | 60 g $A_3$ | 60 g $A_3$ | 60 g $A_3$ | 60 g $A_2$ | 60 g $A_2$ | 60 g $A_2$ |
| Crosslinker | 17.5 g $B_7$ | 19.5 g $B_{27}$ | 6.8 g $B_{12}$ | 6.8 g $B_{13}$ | 7.4 g $B_{14}$ | 11.9 g $B_{24}$ | 10.7 g $B_{25}$ | 11.9 g $B_{23}$ |
| Diluent: |  |  |  |  |  |  |  |  |
| Methoxypropyl acetate | 3.7 g | 7.0 g |  |  |  |  |  |  |
| Butyl acetate |  |  | 5.0 g | 5.0 g | 4.0 g | 7.0 g | 7.0 g | 7.0 g |
| Solids content of the binder combination | 62.6% | 63.0% | 59.7% | 59.7% | 60.5% | 59.9% | 59.3% | 60.0% |
| Initial viscosity (mPa.s) | 2410 | 2050 | 1400 | 2140 | 1940 | 2680 | 2970 | 5130 |
| Viscosity after |  |  |  |  |  |  |  |  |
| 5–6 hours (mPa.s) | 3330 | gels | 19000 | 5860 | 2270 | 5130 | 17800 | gels |
| 24 hours (mPa.s) | 3970 |  | gels | gels | 2930 | 14720 | gels | gels |
| Appearance of the film | colorless | colorless | colorless | colorless | yellow tinges | yellow tinges | yellow tinges | yellow tinges |
| MIBK wiping test (after storage for 16–20 hours at room temperature) | >50 | >100 | >50 | >100 | >50 | >50 | >100 | >100 |

|  | 40 | 41 | 42 | 43 | 44 | 45 | 46 | 47 |
|---|---|---|---|---|---|---|---|---|
| MA copolymer | 60 g $A_{14}$ | 60 g $A_{14}$ | 60 g $A_{14}$ | 60 g $A_{14}$ | 60 g $A_1$ | 100 g $A_{14}$ | 60 g $A_3$ | 60 g $A_1$ |
| Crosslinker | 20.2 g $B_1$ | 16.2 g $B_3$ | 18.9 g $B_4$ | 17.5 g $B_5$ | 11.8 g $B_{10}$ | 14.6 g $B_{22}$ | 7.5 g $B_{11}$ | 10.1 g $B_{17}$ |
| Diluent: |  |  |  |  |  |  |  |  |
| Methoxypropyl acetate | 7.0 g | 7.0 g | 7.0 g | 7.0 g |  | 5.9 g |  |  |
| Butyl acetate |  |  |  |  | 8.0 g |  | 4.5 g | 8.0 g |
| Solids content of the binder combination | 61.2% | 59.6% | 60.8% | 60.0% | 55.4% | 58.2% | 59.9% | 54.5% |
| Initial viscosity (mPa.s) | 3350 | 5540 | 2360 | 3660 | 4600 | 3750 | 1500 | 1040 |
| Viscosity after |  |  |  |  |  |  |  |  |
| 5–6 hours (mPa.s) | 4400 | 5460 | 2990 | 3660 | 3140 | 3450 | 1720 | 3770 |
| 24 hours (mPa.s) | 6700 | 4700 | 3350 | 2930 | 3450 | 6700 | 1810 | 10470 |
| Appearance of the film | colorless | colorless | colorless | colorless | colorless | colorless | colorless | colorless |
| MIBK wiping test (after drying for 20 mins. at 100° C.) | >100 | >100 | >100 | >100 | >100 | >100 | >100 | >100 |

Comparison Examples according to DE-OS No. 2 853 477

Three polyanhydrides were prepared in accordance with DE-OS No. 2 853 477 and were each reacted at room temperature with the bisketimine B(C) 1 used in DE-OS No. 2 853 477, Example 1, and the crosslinker $B_{16}$.

Comparison polyanhydride A (C) 1

A (C) 1 is obtained by reaction of 1 mole of a linear polypropylene glycol having a molecular weight of approx. 1000 g/mol with 2 moles pyromellitic dianhydride at 150° C. A (C) 1 corresponds to polyanhydride G of DE-OS No. 2 853 477.

Comparison polyanhydride A (C) 2

A (C) 2 is obtained by heating 890 g linseed oil and 238 g maleic anhydride for 2 hours to 160° C. A (C) 2 is comparable with polyanhydride F of DE-OS No. 2 853 477.

Comparison polyanhydride A (C) 3

A 20% solution of benzophenone-3,4,3',4'-tetracarboxylic acid dianhydride in DMF. A (C) 3 is used in Example 1 of DE-OS No. 2 853 477.

Comparison ketimine B (C) 1

Reaction product of 1 mole hexamethylenediamine with 2 moles methyl isobutyl ketone. B (C) 1 is ketimine A of Example 1 of DE-OS No. 2 853 477.

The comparison polyanhydrides A (C) 1, A (C) 2 and A (C) 3 were mixed with comparison ketimine B (C) 1 in a molar ratio of 1:1 as in DE-OS No. 2 853 477 and the films dried at room temperature. A (C) 1, A (C) 2 and A (C) 3 were additionally mixed with ketimine B 16 in a ratio by weight of 80:20 and the films dried at room temperature. The results obtained are shown in Table 5 below.

TABLE 5

| | (Comparison Examples) | | | | | |
|---|---|---|---|---|---|---|
| | 1 | 2 | 3 | 4 | 5 | 6 |
| Polyanhydride | 100 g A(C)$_1$ | 100 g A(C)$_2$ | 100 g A(C)$_3$ | 80 g A(C)$_1$ | 80 g A(C)$_2$ | 400 g A(C)$_3$ |
| Crosslinker | 23.6 B(C)$_1$ | 30 g B(C)$_1$ | 25.6 g B(C)$_1$ | 20 g B$_{16}$ | 20 g B$_{16}$ | 20 g B$_{16}$ |
| Initial viscosity (mPa.s) | gels immediately | gel after 15 mins. | 43 | 12100 | gels after 15 mins. | <40 |
| Viscosity after 16 hours (mPa.s) | | | 81 | 25500 | | <40 |
| Appearance of the film after storage for 16-20 hours at room temperature | | yellow, slightly tacky | yellow, tacky | yellow, slightly tacky | yellow, slightly tacky | yellow, tacky |
| MIBK wiping test after storage at room temperature for 16-20 hours | | 40 × detached | >100 | 40 × detached | 40 × detached | 100 × detached |

In Comparison Example 1, the product gels immediately the components are stirred together. In Comparison Examples 2 and 5, there is a rapid increase in viscosity after mixing of the components, the mixtures gelling after about 15 minutes. After storage for 16 hours at room temperature, the films were still slightly tacky and showed only moderate solvent resistance. Comparison Examples 3 and 6 showed no increase in viscosity or only a slight increase in viscosity. However, the films obtained were still tacky after storage at room temperature for 16 hours. The crosslinking values were good in parts. However, the main disadvantage of 3 and 6 are the low solids contents of about 25 to 30%. Mixture 4 showed normal viscosity behavior. However, the film was again tacky and only weakly crosslinked. In addition, all the films of the Comparison Examples were yellow in color.

We claim:

1. Moisture-hardening binder compositions comprising
    (A) copolymers of maleic anhydride with other olefinically unsaturated monomers having a molecular weight Mw in the range from 1500 to 75 000 and
    (B) organic polyamines containing amino groups exclusively present in aldimine- or ketimine-blocked form,
    characterized in that component (A) consists of copolymers prepared in known manner of
    (a) 3 to 45% by weight maleic anhydride,
    (b) 5 to 80% by weight monomers corresponding to the following formula

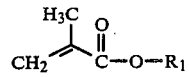

or to the following formula

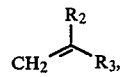

(c) 15 to 92% by weight monomers corresponding to the following formula

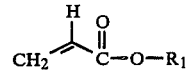

and
    (d) 0 to 20% by weight liquid butadiene (co)polymers having a number-average average molecular weight of 500 to 3500, a viscosity at 20° C. of 200 to 50 000 mPa.s and an iodine value according to Wijs of 380 to 470 g iodine/100 g substance,
    the percentages shown adding up to 100; in the above formulae,
    $R_1$ is an aliphatic or cycloaliphatic $C_1$–$C_{12}$ hydrocarbon radical optionally containing oxygen, sulfur or nitrogen as hetero atoms,
    $R_2$ is hydrogen, a methyl or ethyl group or chlorine or fluorine,
    $R_3$ is an aliphatic $C_2$–$C_{15}$ hydrocarbon radical, a cycloaliphatic $C_5$–$C_{10}$ hydrocarbon radical, an araliphatic $C_7$–$C_{18}$ hydrocarbon radical, an aromatic $C_6$–$C_{12}$ hydrocarbon radical, chlorine, fluorine, a nitrile group or a $C_2$–$C_{18}$ hydrocarbon radical containing one or more hetero atoms from the group comprising oxygen, sulfur and nitrogen in the form of ether, ester, amide, urethane, urea, thioester, thioether, oxirane, ketone, lactam or lactone groups.

2. Binder compositions as claimed in claim 1 characterized in that component (A) comprises
    (a) 7 to 30% by weight maleic anhydride, (b) 10 to 50% by weight of at least one monomer corresponding to the following formula

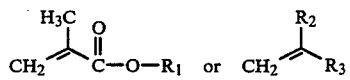

and (c) 25 to 60% by weight of at least one monomer corresponding to the following formula

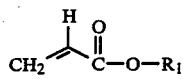

in copolymerized form, the percentages adding up to 100 and $R_1$, $R_2$ and $R_3$ having the meaning defined in claim 1.

3. Binder compositions as claimed in claim 1, characterized in that component (A) is a copolymer which, in addition to other comonomers, contains per 100 parts by weight maleic anhydride 40 to 140 parts by weight of monomers selected from the group comprising styrene, vinyl toluene, α-methyl styrene, α-ethyl styrene, nucleus-substituted diethyl styrenes, isopropyl styrenes, butyl styrenes and methoxy styrenes ethyl vinyl ether, n-propyl vinyl ether, isopropyl vinyl ether, n-butyl vinyl ether, isobutyl vinyl ether, vinyl acetate, vinyl propionate, vinyl butyrate and mixtures of these monomers in copolymerized form.

4. Binder combinations as claimed in claim 1 characterized in that component (B) consists of at least one organic diamine which contains two primary aliphatically or cycloaliphatically bound amino groups present in aldimine- and/or ketimine-blocked form and which has been obtained by the reaction known per se of (i) organic diamines containing two primary aliphatically and/or cycloaliphatically bound amino groups having a molecular weight in the range from 88 to 400 with (ii) aliphatic or cycloaliphatic ketones having a molecular weight in the range from 72 to 200 and/or aliphatic aldehydes having a molecular weight in the range from 58 to 128.

5. Binder compositions as claimed in claim 1 characterized in that component (B) consists of polyamines containing at least two primary amino groups present in aldimine-, ketimine-blocked form or mixtures thereof which have been obtained by blocking of the primary amino groups of a polyamine containing at least two primary amino groups and at least one secondary amino group by reaction with aldehydes, ketones or mixtures thereof and subsequent reaction of the remaining secondary amino groups with diisocyanates.

6. Binder combinations as claimed in claim 1 characterized in that the quantitative ratios between component (A) and (B) correspond to an equivalent ratio of anhydride groups to aldimine and ketimine groups of 0.25:1 to 5:1.

7. Moistures hardening lacquers, coating compositions or sealing compounds comprising the binder compositions claimed in claim 1.

* * * * *